United States Patent

[11] 3,598,241

| [72] | Inventors | Charles H. Vondracek<br>Pittsburgh;<br>Andrew S. Calderwood, Monroiburgh, both of, Pa. |
|---|---|---|
| [21] | Appl. No. | 754,581 |
| [22] | Filed | Aug. 22, 1968 |
| [45] | Patented | Aug. 10, 1971 |
| [73] | Assignee | Westinghouse Electric Corporation<br>Pittsburgh, Pa. |

[54] SUPPORT SYSTEM FOR MEMBRANES USED IN THE REVERSE OSMOSIS PROCESS
8 Claims, 2 Drawing Figs.

[52] U.S. Cl. .................................................. 210/321

[51] Int. Cl. ...................................................... B01d 13/00
[50] Field of Search .......................................... 210/23, 321, 496

[56] References Cited
UNITED STATES PATENTS
3,400,825  9/1968  Shippey........................ 210/321

Primary Examiner—J. L. DeCesare
Attorneys—F. Shapoe and A. Mich

ABSTRACT: An open pore tube for use with reverse osmosis water purification membranes is made of bonded resin coated filler particles.

PATENTED AUG 10 1971

3,598,241

WITNESSES
Robert C Baird
Daniel P. Cillo

INVENTORS
CHARLES H. VONDRACEK
ANDREW S. CALDERWOOD
BY Alex Mich Jr.
ATTORNEY

SUPPORT SYSTEM FOR MEMBRANES USED IN THE REVERSE OSMOSIS PROCESS

BACKGROUND OF THE INVENTION

This invention relates to porous hollow vessels and to methods of manufacturing them. More particularly, this invention relates to an open pore tube made of bonded resin coated filler particles which serves as a support tube for cellulose acetate or other reverse osmosis membranes.

The major advantage of reverse osmosis as a saline or contaminated water conversion process is the low-energy requirement as compared to other processes. The function of a cell for the reverse osmosis process is to bring a saline or contaminated water solution at high pressure in contact with a supported semipermeable membrane.

There are several metals and metal combinations which can be used for the tubular-type membrane support and pressure containing components in a reverse osmosis system. The most promising of the metals so far considered are clad carbon steels with alloys of copper and nickel or stainless steels as the cladding material. These components easily conform to the 10 p.s.i. to 1,500 p.s.i. pressure requirements of such a system but the initial material cost is very expensive. Such components must be drilled with holes to permit the pure water to be removed from a saturable medium such as a fabric that is wound around the membrane forming a sump between the pipe and the membrane. This also adds to fabrication costs.

Porous fiberglass components have been used in reverse osmosis pilot plant operations for several years successfully. Such components while strong and resistant to corrosion are still relatively expensive and require elaborate production equipment. One problem associated with the filament wound fiberglass product is the difficulty of making bends for the straight tubes. Many times hand finishing is required with consequent increase of cost and time for fabrication.

SUMMARY OF THE INVENTION

Accordingly, it is the object of this invention to provide a low-cost corrosion resistant reverse osmosis membrane support tube made of resin bonded filler particles which can be cast in any desired shape.

Briefly, this object is accomplished by coating catalyst and resin onto filler particles and pouring the resulting free flowing particulate composition into a mold. The mold is then heated to cure the resin. The cure process transforms the composition into a strong rigid open pore structure.

BRIEF DESCRIPTION OF THE DRAWINGS

For a better understanding of the nature and objects of the invention, reference may be had to the following drawings, in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to described this process. A detailed analysis of this phenomena can be found in U. Merten, Desalination by Reverse osmosis, M.I.T. Press, 1966.

Figure 1:
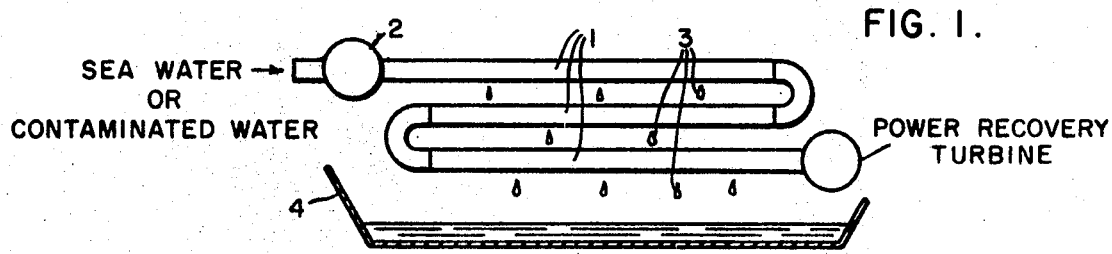
FIG. 1 is a diagram showing the principle for extracting fresh water from sea or contaminated water by reverse osmosis.

FIG. 1 illustrates a typical tubular-type reverse osmosis system. Sea water or contaminated water is pumped through a battery of support tubes 1. The pump 2 must exert a pressure of at least 10 p.s.i. and can operate as high as 1,500 p.s.i. The tubes can be mounted in batteries of about 150 each. They serve to support the reverse osmosis membrane contained within the tube wall. The membrane is usually made of modified cellulose acetate i.e., aqueous magnesium perchlorate and acetone modified cellulose acetate having an acetyl content of about 39 percent by weight. Such membranes will last about 6 months in operation, are selected because of their favorable transport characteristics and ready solubility in suitable casting solvents. For a more detailed description of reverse osmosis membranes see Modern Plastics, Vol. 45, May 1968, pp. 141—148. Other membranes that are particularly suitable as liners with the support tubes of this invention are those made of graphitic oxide as disclosed by Flowers and Berg in U.S. application Ser. No. 615,837 assigned to the assignee of this invention and filed on Feb. 13, 1967.

The tube walls that support the reverse osmosis membranes must be able to withstand the pressure exerted on them by the pump and must be able to allow egress of the pure water 3 into a collecting pan 4. For sea water several passes through a system of this type may be required before the water is usable.

Figure 2:
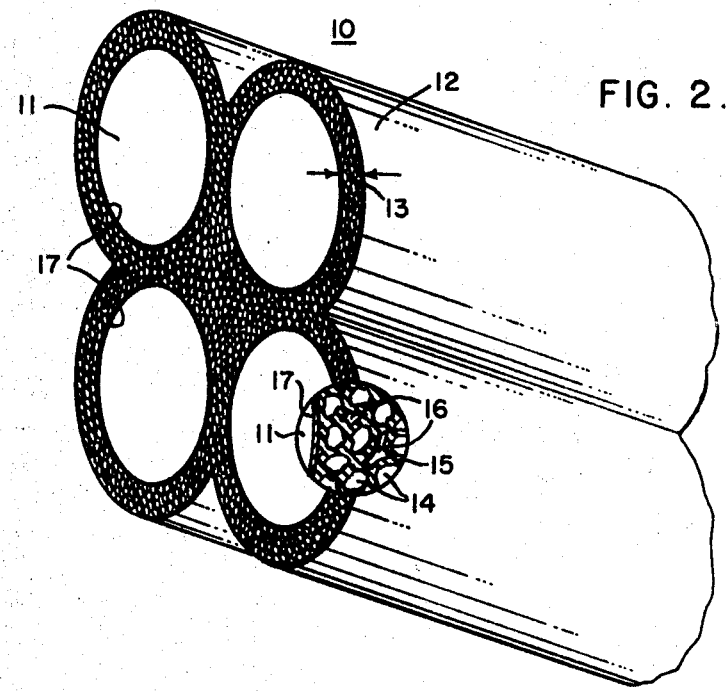
FIG. 2 is a three dimensional cross-sectional view of one embodiment of the reverse osmosis support tube of this invention.

FIG. 2 shows one embodiment of this invention wherein the tube 10 contains four axial holes 11. Since the tube is made by casting techniques there is no limit to tube design. The tube walls of 12 of thickness 13 comprise filler particles 14 coated with an organic resin 15 which bonds the filler particles together.

A resin solution, usually with an added catalyst is coated onto the filler particles in such a way as to leave a thin, dry, uncured film on each filler particle. The resulting particulate composition is free flowing and is cast into a mold of the desired configuration. The mold is then heated to cure the resin. The mold is then cooled and removed. The curing process transforms the filler-resin catalyst composition into a strong rigid open pore tube of bonded resin coated filler particles. This tube 10 contains voids or pores 16 between the resin coated filler particles allowing egress of the pure water which has passed through the reverse osmosis membrane 17 supported by the inside of the tube walls. The area and number of the voids will vary inversely with the amount of resin and catalyst that is coated onto the filler particles.

On curing, the thin film of resin bonds each filler particle on the adjacent particles. It is readily seen that the type and amount of resin used, the size of the filler particles and the wall thickness can be adjusted to give a considerable range in the strength and porosity of the resultant tube. However, for any given filler-resin tube the strength increases with increasing resin content and the porosity decreases.

Phenolic resins, which are preferred because they can be bought cheaply and in readily usable form are well known in the art and are thoroughly discussed in Megson, Phenolic Resin Chemistry, Academic Press, 1958, particularly chapter 3. They are conventionally obtained by reacting a phenolic substance such as phenol itself or substituted phenols such as cresols, xylenols, or butyl phenol with an aldehyde such as formaldehyde, propionaldehyde, acetaldehyde, benzaldehyde, or furfural. The characteristics of the materials formed by the reaction of phenols with aldehydes can be varied widely by choice and ratio of reactants and by such reaction conditions as acidity, alkalinity, temperature, time, catalysts or accelerators and presence and nature of solvent or diluent.

One-step phenolic resins (resols) are made with basic catalysts such as inorganic hydroxides, quaternary ammonium hydroxides, or tertiary amines. This type of resin has at least one mol of formaldehyde per mol of phenol. The first part of the reaction is the addition of the formaldehyde to the phenol to form a phenol alcohol or methylol phenol. The second part of the reaction is condensation polymerization wherein the initially water soluble product is transformed into a resin of increasing molecular weight and decreasing water tolerance. Curing of one-step resins occurs by the further condensation of residual methylol groups to yield an insoluble, infusible network structure.

Two-step phenolic resins (novolaks) are obtained with acidic catalysts and less than 1 mol of formaldehyde per mol of phenol. In the acid catalyzed reaction, although methyols are formed as intermediates, they are immediately, under the influence of the acid, converted to methylene links. These resins are characterized by requiring additional formaldehyde or some cross-linking agent such as hexamethylenetetramine to cure.

Other resins well known in the art which may be used as the coating and bonding agent in this invention include: polyglycidyl ethers (see Lee and Neville, Handbook of Epoxy Resins, McGraw Hill, 1966; particularly chapter 2), polyesters (see Bjorksten, Polyesters And Their Applications, Reinhold Publishing Corporation, 1956, pp. 1—34), silicones and polystyrenes (see Brydson, Plastic Materials, D. Van Nostrand Company, 1966, chapters 25 and 13), polyimide and polyamide-imide resins (see Frost and Bower, "Aromatic Polyimides, " J. Polymer Science, Part A, Vol. 1, 1963, 3135—3150 and U.S. Pat. No. 3,179,631; No. 3,179,632; No. 3,179,633 and No. 3,179,634 634 on polyimides and U.S. Pat. No. 3,179,635 on polyamide-imides).

Solvents which have been found to be suitable for use in this invention comprise, in general, alcohols, such as methanol, ethanol, propanol, isopropanol, and the like; ketones such as acetone, aromatic hydrocarbons such as xylene, toluene, benzene, and the like, and the normally liquid organic solvents of the N,N-dialkylcarboxylamide class such as dimethyl acetamide and the like. It will be understood, of course, that the particular solvent employed must be a solvent for the particular resin used.

The majority of these resins are curable to a solid state by heating them to their curing temperature in the presence of a suitable polymerization catalyst. Examples of such catalysts would include, for example when the resin is a phenolic resin, hexamethylenetetramine, formaldehyde, paraformaldehyde, furfuraldehyde, acetaldehyde, polymethylolphenols, alkali metal and alkaline earth metal salts of polymethylolphenols. When the resin is an epoxy resin, suitable catalysts would include dicyandiamide, triethanolamine borate, metaphenylenediamine, diphenylamine, melamine, quinoline, hexamethylenetetramine, urea, and substituted ureas such as alkyl ureas an example being tetraethyl urea, and guanidines. When the resin is a polyester resin, examples of suitable catalysts would include, benzoyl peroxide, laurol peroxide, methyl ethyl ketone peroxide, t-butyl hydroperoxide, ascaridole, tert-butyl-per-benzoate, di-t-butyl diperphthalate, ozonides and thelike. When the resin is a silicone, examples of suitable catalysts would include, dicumyl peroxide, benzoyl peroxide, laurol peroxide, methyl ethyl ketone peroxide, t-butyl hydroperoxide, di-t-butyl diperphthalate, ozonides, and the like. When the resin is a polystyrene resin examples of suitable catalysts would include benzoyl peroxide, laurol peroxide, tertiary-butyl hydroperoxide, di-tertiary-butyl peroxide and tert-butylper-benzoate.

The finely divided filler particles used in accordance with this invention may be spherical, oval, cubical, or of other irregular configuration. Some examples of suitable filler particles are sand, zircon, quartz, beryl, talc, glass, limestone, calcium silicate, or any other filler with a granular structure. Especially suitable are lightweight fillers such as hollow spherical glass beads, vermiculite, expanded perlite, and ground pumice stone. The preferred average particle size range is between 50 and 150 microns although the outer limits are between 40 and 500 microns. Below 40 microns the resin-filler support tube lacks the desire porosity for low resistance to water flow and above 500 microns the tube does not properly support the membrane.

The weight percent resin that can be used in this invention will vary depending upon the type filler and its fineness. For example, the weight percent resin will range from 2 to 18 percent of the coated filler particle weight when sand is used and 1 to 10 percent when zircon is used as the filler. The lightweight fillers will cause correspondingly higher weight percent resin values. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

EXAMPLE I

A membrane support tube was made containing four axial holes. To 1,000 grams of washed dry sand having an average particle size of 60 microns was added 9 grams of hexamethylenetetramine catalyst. This was mixed for 1 minute in a muller. Then 56 g. of the reaction product of a phenol and an aldehyde, in solution, having a viscosity at 25° C. of 4,200 cp and a solids content at 135° C. of 67 percent (sold commercially by Hooker Chemical Corporation under the trade name Durez Phenolic Resin 18115), was added and the combination mixed in a muller for 10 minutes until it was dry and free flowing. The resin catalyst coated sand composition was poured into a 18 inch cylindrical mold which contained four axial tubes symmetrically placed. Filling was performed on a vibrating table to facilitate packing and flow. The filled mold was then cured at atmospheric pressure for 16 hours at 135° C. to solidify the composition. The mold was then stripped and a strong rigid cast cylinder of resin coated sand particles containing four axial holes was obtained. It contained 3.58 weight percent actual resin i.e., (56) (.67)/[(56 ) (.67)++1000+9]. Tubular reverse osmosis membranes were placed in the four holes, which had a one-half inch inside diameter, and the device tested. Wall thickness of the tube was about three-fourths inch. During testing the cylinder was subjected to 30 p.s.i. water pressure. It withstood the pressure easily and passed the purified effluent water readily. At this wall thickness and inside tube diameter pressures of about 400 p.s.i. would be used. Using the same inside tube diameter and enlarging wall thickness to 1½ inches, pressures of about 800 p.s.i. could be sustained.

The sand used can be round or angular. Angular sand is preferred because there is less chance of mold cracking. Any weight percent ratio is satisfactory that will provide sufficient porosity while maintaining adequate strength in the tube. The amount of catalyst will vary with the resin used and must be sufficient to obtain thermosetting properties. These tubes are corrosion resistant, should easily withstand the pressures necessary for reverse osmosis operation and can be easily fabricated in all shapes and configurations in lengths up to about 15 feet. These tubes can also be externally supported by any suitable means in order to better resist pressure.

I claim:

1. An open pore tube having a wall containing bonded resin coated filler particles having a granular structure, wherein the resin constitutes about 2 to 18 weight percent of the resin coated filler particle weight and the filler has an average particle size between 40 and 500 microns, and a reverse osmosis membrane supported inside said wall.

2. The tube of claim 1 wherein the resin coating is selected from the group consisting of phenolics, polyglycidyl ethers, polyesters, silicones, polystyrenes, polyimides and polyamide-imides.

3. The tube of claim 2 wherein the reverse osmosis membrane is selected from the group consisting of modified cellulose acetate and graphitic oxide.

4. The tube of claim 3 wherein the tube is externally supported and the filler particles are selected from the group consisting of sand, zircon, quartz, beryl, glass, hollow spherical glass beads, expanded perlite, ground pumice stone, and calcium silicate.

5. The tube of claim 4 containing axial holes therein, the membrane supported inside said axial holes, wherein the resin coating is a phenolic resin and the filler is sand having an average particle size between 50 and 100 microns.

6. A hollow vessel having a wall containing bonded resin coated granular filler particles having voids therebetween, wherein the resin constitutes about 2 to 18 weight percent of the resin coated filler particular weight and the filler has an average particle size between 40 and 500 microns, and a reverse osmosis membrane supported by said wall.

7. In combination, a rigid porous member and a semipermeable reverse osmosis membrane supported by said porous member, the porous member comprising inorganic particles having an average particle size between 40 and 500 microns and having a resinous film deposited thereon, said resinous film constituting about 4 to 32 volume percent of the porous member and bonding together adjacent inorganic particles to form said rigid porous member.

8. The combination of claim 7 wherein the inorganic particles are sand particles and the resinous film is a film of phenolic resin.